Feb. 25, 1969 — W. A. WEMYSS — 3,429,182
FLUID FLOW METERS
Filed Aug. 19, 1966 — Sheet 1 of 2

INVENTOR
WILLIAM A. WEMYSS

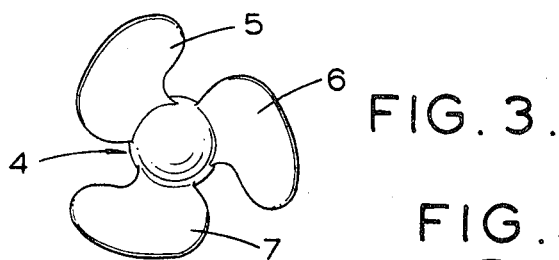
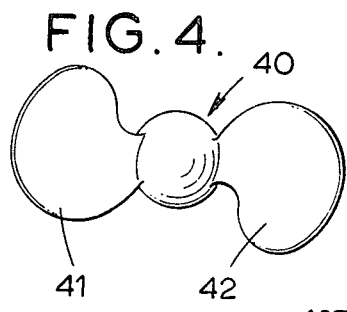
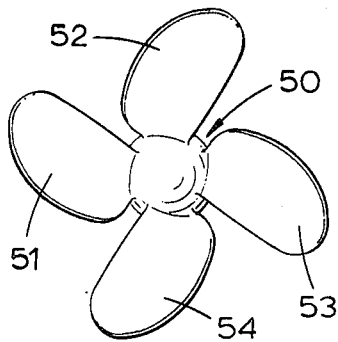
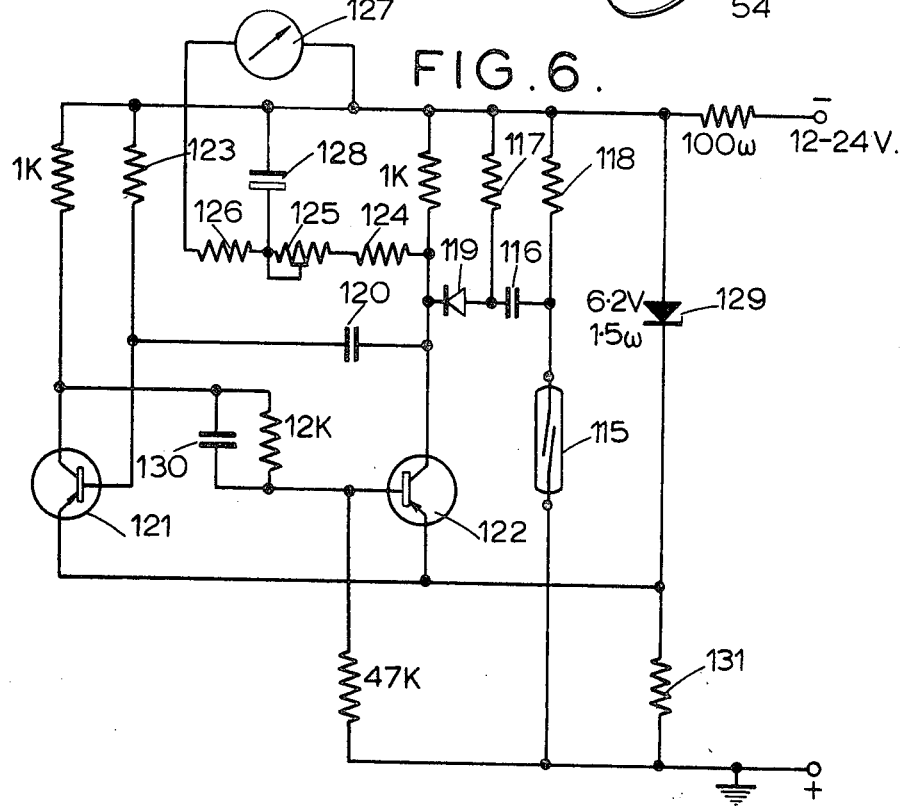

![United States Patent Office]

3,429,182
Patented Feb. 25, 1969

3,429,182
FLUID FLOW METERS
William Alexander Wemyss, Northwood, England, assignor to B. Rhodes & Son Limited, Essex, England, a British corporate body
Filed Aug. 19, 1966, Ser. No. 573,525
Claims priority, application Great Britain, Sept. 2, 1965, 37,556/65
U.S. Cl. 73—229                              6 Claims
Int. Cl. G01f 1/00

ABSTRACT OF THE DISCLOSURE

The shaft of a flow meter intersects the fluid passage at a predetermined angle and the flow measuring blades are fixed to a shaft at substantially the same angle of inclination whereby the blades during their rotation pass through a position at which they lie parallel with the fluid flow. The shaft is rotatably carried by the plug member received within a branch of the conduit element guiding the fluid, and the outer end of the shaft carries a magnetic transducer whereas the plug element carries a pick-up element isolated from the shaft.

BACKGROUND OF THE INVENTION

Flow meters of the turbine or propeller type are in use and a typical example of such a meter has a turbine or propeller unit positioned in a restricted portion of a pipe through which the fluid flow to be measured passes, the unit being mounted for rotation about the axis of the pipe. The turbine or propeller blades are of magnetic material. The arrangement is such that the speed of rotation of the blades is proportional to the volume of fluid passing along the pipe.

The speed of rotation of the turbine or propeller is sensed electro-magnetically or magnetically and in a typical example this sensing system consists of a coil having a magnetised core, the axis of the coil being at right angles to the flow in the pipe, and is adjacent thereto. Rotation of the turbine or propeller causes a variation in the field of the core and induces an alternating voltage in the coil of the order of a few millivolts, the voltage being proportional to the speed of rotation of the turbine or propeller.

This small alternating voltage has then to be changed into a suitable form for provision of the indication of flow rate. For this purpose it has first to be amplified to produce a usable voltage and is then processed through various stages to provide an analogue meter reading in the required units. To ensure accuracy of the meter reading a stabilised voltage supply is essential and great care must be taken to avoid interference from other electrical equipment.

This type of flow meter has a number of disadvantages inherent therein. Firstly the equipment necessary to provide accurate reading is complex and expensive. Secondly the turbine or propeller unit is mounted directly in the pipe and therefore cannot be removed without breaking the pipeline making maintenance and replacement difficult. Thirdly the pipe section in which the turbine or propeller unit is mounted is usually a non-standard section. Fourthly it is usual to make the turbine or propeller blades from stainless steel machined from the solid for accuracy and the necessity of long life because of replacement difficulties. Fifthly, because of its low voltage output, the sensing coil must be positioned near to an amplifier if interference is to be avoided. Sixthly the power needed to drive the turbine or propeller, particularly in view of the very restricted passageway for the fluid necessary to bring the rotor up to high speed for operation in the linear range, is often a large percentage of the pumping power required, i.e. there are large head losses at maximum flow rates.

SUMMARY OF THE INVENTION

According to the invention there is provided a fluid flow meter for measuring the flow of fluid in a pipe comprising a turbine or propeller head having a plurality of blades thereon and adapted to be positioned in the pipe, a shaft on which the turbine or propeller head is mounted for rotation therewith, the shaft being inclined to or at right angles to the direction of fluid flow and being of a length such that it will extend out of the fluid path, and means associated with the shaft whereby the rotation of the shaft can be determined.

It is to be understood that the term "inclined to the direction of fluid flow" also includes tangential thereto where the fluid flow is, for example, in a curved pipe.

Preferably the means for determining the rotation of the shaft comprises a magnetised member mounted on the shaft for rotation therewith and a magnetically operated switch positioned adjacent to the magnetised member so as to be opened and closed thereby on rotation thereof, the arrangement being such that the frequency of opening or closing of the switch is directly proportional to the speed of rotation of the shaft.

The invention will now be described in greater detail by way of example with reference to the accompanying drawings, in which:

FIGURE 3 is a plan view of the propeller head of the flow meter of FIGURES 1 and 2;

FIGURES 4 and 5 are plan views of two alternative propeller heads; and

FIGURE 6 is a circuit diagram of a typical circuit for use with the flow meter.

Figure 1:
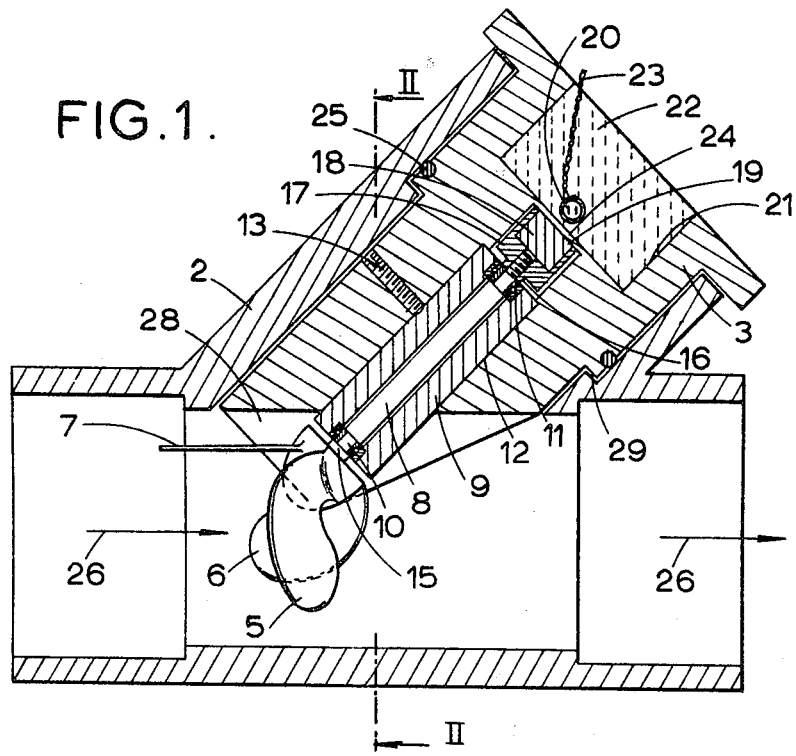
FIGURE 1 is a longitudinal sectional view of a pipe section incorporating a flow meter in accordance with the invention designed for measuring liquid flow.
Figure 2:
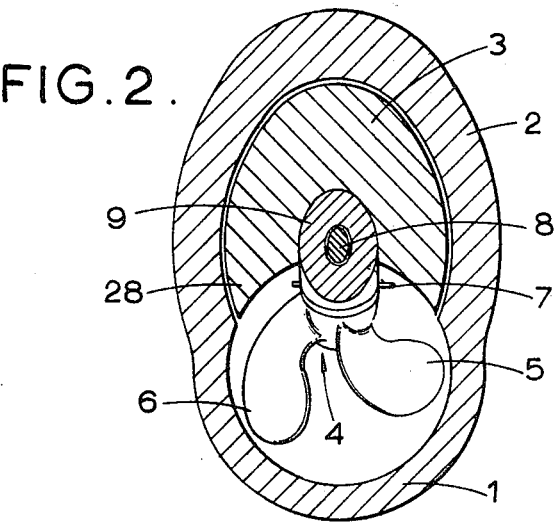
FIGURE 2 is a sectional view taken on the line II—II of FIGURE 1.

Referring first to FIGURES 1 to 3, the flow meter of the invention can be incorporated in a standard Y section of pipe, the straight leg 1 of the pipe providing in the present instance a liquid flow passage, and the branch arm 2 housing a unit 3 in which the flow meter is mounted.

The flow meter itself comprises a propeller head 4 having three blades 5, 6 and 7 mounted for rotation with a shaft 8. The shaft 8 is mounted in a housing 9 on ball races 10 and 11. The housing itself is mounted in a bore 12 in the unit 3 and is secured therein by a set screw 13. The ball races 10 and 11 are retained on the shaft by means of a member 15 which is screwed onto the shaft 8 and to which the propeller head is attached and by means of a magnet holder or pot 17. The member 15 forms an insert in the propeller head 4.

The magnet holder or pot 17 is, as mentioned, attached to the shaft 8 for rotation therewith. Housed within the pot 17 is a circular magnet 18 which is magnetised so that it presents two diametrally spaced opposite poles on its surface 19.

A magnetically operated reed switch is diagrammatically shown at 20 positioned in a cup-like recess 21 in the unit 3. The switch 20 is embedded in a plug 22 either by moulding it therein or by positioning it in a recess therein. Connecting wires 23 are shown protruding from the plug 22. The plug may be a permanent fixture in the unit 3 or may be removable therefrom to enable the reed switch to be changed.

The plug 22 is separated from the magnet 18 by a wall 24 integral with the module 3 which renders the bore 12 blind, and thus obviates the necessity of rotary seals, the flow meter running, effectively, in the fluid. The unit 3 is sealed in the pipe leg 2 by an O-ring 25, the unit 3 being a sliding fit in the pipe leg 2. Positive engagement of the unit 3 in the pipe leg 2 can however be provided if desired, or the unit can be locked in by means of a set screw (not shown).

The form of the blades is determined empirically, the form of blade shown in the drawings being designed for liquid flow in the direction of the arrows 26. Each blade has a pitch angle of 30° and the root of each blade is inclined at 45° to its shaft. It will be seen that while one blade is moving in the direction of flow, the second blade is moving counter to the direction of flow and the third blade is moving transversely to the flow and presents only its edge to the direction of its motion. That is to say, by inclining the roots of the blades with respect to the shaft at the same angle at which the shaft is inclined relative to the direction of fluid flow, each blade will be parallel to the fluid flow in one rotational position thereof. Because none of the blades overlap, it is very suitable for construction by moulding. For best results it is preferable that the blades should lie within a 2" sphere for a 2" pipe.

It has been found that a propeller of this type in a 2" pipe will rotate at about 2,000 r.p.m. when driven by a liquid flow of 100 gallons per minute.

In order to avoid any disturbance of the fluid flow due to the Y pipe section, the unit 3 is shaped as at 28 (see especially FIGURE 2) to conform to the normal pipe section.

The materials from which the flow meter is made can be of any suitable type, but the following materials are considered especially suitable from both a functional and economic point of view:

Shaft 8—stainless steel.

Propeller head 4—synthetic resin such as nylon or glass filled nylon with a stainless steel insert or a stainless steel investment casting.

Housing 9—polyvinyl chloride or bronze.

Unit 3—polyvinyl chloride or bronze.

Insert 15—stainless steel.

Magnet pot 17—any suitable non-magnetic material such as stainless steel.

The operation of the flow meter will now be described.

To insert the flow meter unit into a pipe already provided with Y sections, a plug or whatever is closing the pipe is removed and the unit is slid into the pipe until shoulders 29 seat on the shoulder formed by the end of the enlarged section used normally for attachment of further pipe lengths. The unit can then be locked in place by the set screw previously mentioned. Care must be taken to ensure correct orientation of the unit in the pipe.

The wires 23 are connected up to the appropriate electrical circuitry for reading purposes. It will be noted that a voltage of the order of 10 volts can be connected to the switch 20 which will permit a very long length of wire to be used between the unit and the appropriate electrical circuitry. Only where exceptional circumstances exist will amplification be necessary.

Once the unit is tightly in place and connected up, the pumping operation can be started and the flow of liquid through the pipe will cause rotation of the propeller head 4. This in turn rotates the shaft 8 and with it the magnet 18. This rotation of the magnet 18 will cause a rotating field to act on the reed switch 20 and open and close it twice per revolution of the shaft. Thus the frequency of opening and closing of the switch 20 will indicate the speed of rotation of the propeller head and this operation of the switch can be used to provide analogue and/or digital information in a manner to be described hereafter with reference to FIGURE 6.

Referring now to FIGURES 4 and 5, there are shown two alternative forms of propeller head labelled namely 40 and 50 respectively. The propeller head 40 is provided with a formation of two blades 41 and 42 and the propeller head 50 is provided with four blades 51, 52, 53, 54. Although it is thought that the three bladed propeller gives the best results, it is envisaged that the two or four bladed propeller may be successfully employed. In fact if it should prove successful even more blades may be used.

FIGURE 6 shows a circuit suitable for use with the above described unit for providing an analogue indication. In general the reed switch 20 is positioned to open and close an energised circuit and therefore provides a D.C. pulsed output of a frequency proportional to the rate of flow of the liquid and this is applied to a measuring instrument through a mono-stable circuit. A suitable meter for the purpose is a D'Arsonval moving coil meter of which the deflection is unidirectional and proportional to energy, i.e. a one milliamp movement will show a full deflection on a current of one milliamp continuously or on a current of 2 milliamps intermittently for 50% of the time etc. This feature is effective until the frequency is so low as to cause the meter to follow the individual pulses.

Thus the indicator circuit of FIGURE 6 will be seen to be a frequency to D.C. converter, arranged to operate as a mono-stable multi-vibrator. The pulses from the reed switch 115 (20 in FIGURES 1 and 2) trigger the mono-stable circuit which gives out a pulse of the same energy each time it is triggered. At low speeds there is only a small amount of energy going to the meter, and at high speeds there will be a directly proportional higher energy.

The mono-stable circuit used is of a conventional form using transistors. The input from the reed 115 comes from the .001 f. capacitor 116 which is charged up through a 10KΩ resistor 117 and discharges through a 100KΩ resistor 118 when the reed switch 115 opens. A diode 119 applies only the positive-going pulses through the 1 mfd. capacitor 120, cutting off a transistor 121, which allows the voltage of the collector thereof to rise to the negative supply voltage.

This applies a negative pulse to another transistor 122 which switches on, charging up capacitor 120 and holding it in this unstable state until the capacitor 120 discharges through a 12KΩ resistor 123 and the circuit reverts to await another pulse through the diode 19. The output pulse goes through resistors 124, 125 and 126 of values 2.7K, 1K, and 470 ohm respectively to the meter 127, which deflects in proportion to the energy of each pulse. The circuit cannot be triggered again until the pulse is complete due to the diode 19 being back biassed. This ensures that one of the disadvantages of reed switches, namely reed bounce, cannot affect the meter reading obtained. After completion of the pulse, the circuit is then available to accept the next pulse from the reed switch 115. The 470 ohm resistor 126, in conjunction with a 1000 mfd. capacitor 128, smooths the meter deflection at low speeds with the energy stored in the capacitor. The energy of the pulse applied is controlled by a Zener diode 129 for amplitude and by the resistor-capacitor circuit 123, 120 for duration. There are a number of other factors, such as the impedance of transistor 121, which affect the size of the pulse, but this is reasonably constant. A 220 pf. capacitor 130, is used to speed up the switching which is slowed by the input capacity of transistor 122. The switching to the unstable state is completed before the end of the switching pulse applied through the diode 119.

The voltage across the Zener diode 129 increases to a small degree from an increase of the supply voltage, with the increasing current and to compensate for some of this, the size of the pulse is reduced when the Zener is under such current conditions, because the current flows through a 150 ohm resistor 131 and holds off the transistor 122 for a slightly longer period. The supply from the reed switch 115 is directed to the same point with the dual advantage that the common potential is on one side of the reed 115 and there is little change in output over input supplies from 12 to 24 volts. The result is a variation of less than 1% for the 100% increase in supply volts.

The pulse from the .001 f. capacitor 116 is of fairly low energy, and the current through the reed switch 115 is also low, making for longer life of the switch. Diffused gold contacts in the switch are preferred. The output pulse should be approximately 60% of the cycle at maximum speeds for the best linearity.

The above described circuit provides the analogue indication from a plurality of pulses of substantially constant energy, and it will be readily appreciated that in effect, each pulse represents a certain volume of liquid. In this way digital information is provided and this can be used in well known fashion to provide indications of total volume passing the flow meter over any required period and enables batch control to be performed if desired. The form of the information being digital, the arrangement lends itself to provide printed information, by way, for example, of a printer, of a greater accuracy than can be achieved by a graph from an analogue system.

The circuits necessary to achieve these effects are not described here as such circuits are well known in the electronics art.

It will be appreciated that various modifications may be made to the above described embodiment without departing from the scope of the invention. For example instead of the shaft inclination shown (45° in the standard fitting of FIGURES 1 and 2) any other inclination can be used which will allow the shaft to extend beyond the flow in the pipe. Thus the shaft could be at right angles, using a standard T section pipe with a differently designed propeller, or if positioned in a pipe lead, it could be tangential to the flow direction. For simplicity, it is of course best to use only standard pipe sections in which case the angles used would normally be only 30°, 45°, 60° and 90°.

If desired, an on the spot indication could be provided by mechanical coupling to the shaft but of course this would make the meter more expensive due to the need to provide rotary seals. However on the spot indication could be provided by a magnetic coupling to overcome this.

Other methods of indicating the rotation of the shaft could be used if desired although it is believed that the method described leads to the best results. In order to avoid rotary bearings being used these methods would normally be of an electromagnetic form.

Although the above described embodiments have related to liquid flow meters, it will be understood that the invention is equally applicable to gas flow meters although a modified propeller design might be necessary.

I claim:
1. A fluid flow meter comprising, in combination,
a conduit member defining a passage therethrough for guiding fluid through it along a predetermined path,
a rotatable shaft having one end projecting into said passage and the axis of which shaft lies at a predetermined acute angle with respect to said predetermined path of fluid flow,
a plurality of blades fixed to said one end of the shaft for impingement thereagainst of fluid flowing through the conduit member,
the root of each of said blades lying at an angle to said shaft substantially equal to said predetermined acute angle whereby each blade lies substantially parallel with the path of fluid flow at one rotational position thereof,
and means for determining the rotation of said shaft.

2. A fluid flow meter as claimed in claim 1, wherein the means for determining the rotation of the shaft comprises a magnetised member mounted on the shaft for rotation therewith and a magnetically operated switch positioned adjacent to the magnetised member so as to be opened and closed thereby on rotation thereof, the arrangement being such that the frequency of opening or closing of the switch is directly proportional to the speed of rotation of the shaft.

3. A fluid flow meter as claimed in claim 2, wherein the shaft and magnetised member are carried by a unit which is shaped to fit into a standard pipe fitting.

4. A fluid flow meter comprising, in combination,
a conduit member defining a passage therethrough for guiding fluid along a predetermined path,
said conduit member having a branch opening into said passage at a predetermined acute angle,
a supporting unit forming a plug for said branch, said unit having an inner end face forming a smooth continuation of said passage,
a shaft journalled in said unit, said shaft being inclined at said predetermined acute angle with respect to said predetermined path and having an inner end projecting from said unit into the passage and an outer end terminating short of the outer end of the unit,
a plurality of blades mounted on said inner shaft end and each blade having its root inclined with respect to the axis of said shaft substantially at said predetermined angle,
a magnetic transducer mounted on said outer end of the shaft,
and a pick-up device mounted in the outer end of said unit and isolated from said shaft, said pick-up device producing a signal indicative of rotation of said shaft.

5. A fluid flow meter as claimed in claim 4, wherein the shaft and transducer are carried in a blind bore in said supporting unit, which bore is in communication with the fluid being measured, the bore being closed at its blind end by a wall behind which the pick-up device is positioned, and whereby fluid cannot escape from the blind bore and come into contact with the pick-up device.

6. A fluid flow meter as claimed in claim 5, wherein the supporting unit is shaped to fit a standard pipe fitting.

References Cited

UNITED STATES PATENTS

| 2,770,131 | 11/1956 | Sparling | 73—231 |
| 3,248,944 | 5/1966 | Karlby et al. | 73—231 |

FOREIGN PATENTS

| 323,198 | 12/1929 | Great Britain. |

JAMES J. GILL, *Primary Examiner.*

EDWARD D. GILHOOLY, *Assistant Examiner.*

UNITED STATES PATENT OFFICE
CERTIFICATE OF CORRECTION

Patent No. 3,429,182            Dated February 25, 1969

Inventor(s) William Alexander Wemyss

It is certified that error appears in the above-identified patent and that said Letters Patent are hereby corrected as shown below:

In the Abstract of the Disclosure, last line, after "shaft", insert --whereby the transducer will act on the pick-up element during rotation of the shaft and cause a suitable reading on a meter to determine the speed of rotation of the shaft--.

Col. 2, lines 15 and 19, in each, before "rotation" insert --speed of--.

Col. 5, line 46, before "rotation" insert --speed of--.

Col. 6, line 8, (claim 1, last line), before "rotation" insert --speed of--.

Col. 6, line 10, (claim 2, line 2), before "rotation" insert --speed of--.

Col. 6, line 43, (claim 4, last line) before "rotation" insert --speed of--.

SIGNED AND SEALED MAR 9 1971

(SEAL)
Attest:

Edward M. Fletcher, Jr.
Attesting Officer

WILLIAM E. SCHUYLER, JR.
Commissioner of Patents